United States Patent [19]

Hori

[11] Patent Number: 4,914,461

[45] Date of Patent: Apr. 3, 1990

[54] CAMERA HAVING VARIABLE ILLUMINATION ANGLE STROBE DEVICE AND ZOOM LENS

[75] Inventor: Masakatsu Hori, Tokyo, Japan

[73] Assignee: Asahi Kogaku Kogyo K.K., Tokyo, Japan

[21] Appl. No.: 367,735

[22] Filed: Jun. 19, 1989

Related U.S. Application Data

[63] Continuation of Ser. No. 244,009, Sep. 14, 1988, abandoned.

[30] Foreign Application Priority Data

Sep. 14, 1987 [JP] Japan .................................. 62-230749

[51] Int. Cl.⁴ ............................................. G03B 15/03
[52] U.S. Cl. ............................ 354/149.1; 354/149.11; 354/195.1
[58] Field of Search .............. 354/413, 419, 126, 141, 354/145.1, 149.1, 149.11, 195.1

[56] References Cited

U.S. PATENT DOCUMENTS

3,798,668 3/1974 Hartmann ........................ 354/149.1

Primary Examiner—Michael L. Gellner
Attorney, Agent, or Firm—Sandler, Greenblum & Bernstein

[57] ABSTRACT

A camera includes a zoom lens which has a group of variable power lenses for changing the focal length thereof, a variable illumination angle strobe device which has an illumination angle varying mechanism having a condenser lens, a light emitting tube and a light reflecting shade which are relatively movable in the optical axis direction to change the illumination angle. The illumination angle varying mechanism includes a device for controlling the illumination angle in association with the focal length of the zoom lens and a device for controlling the illumination angle independently of the first mentioned device.

22 Claims, 6 Drawing Sheets

CAMERA HAVING VARIABLE ILLUMINATION ANGLE STROBE DEVICE AND ZOOM LENS

This is a continuation of application Ser. No. 244,009 filed on Sept. 14, 1988, now abandoned.

BACKGROUND OF THE INVENTION

1. Field of the Invention

The present invention relates to a camera having a zoom lens and a variable illumination angle strobe device incorporated in the camera and, more particularly, it relates to a camera in which the illumination angle of the strobe device can be either automatically varied in accordance with the change of the focal length of the zoom lens or manually adjusted independently of the variation of the focal length.

2. Description of Related Art

In general, in a conventional lens shutter type of auto-focus camera, it is impossible to vary focal length of the photographing optical system. There is also known a two-focal length type of lens shutter type camera in which a lens for varying the focal length can be selectively inserted in the photographing optical system. However, even in such a two-focal length type camera which makes it possible to use two focal lengths, such as a wide angle and a telephoto range of the zoom lens or a standard range and a telephoto range of the zoom lens, it is impossible to cover the focal length range in between these two extreme focal lengths or between the wide angle and the medium telephoto. Because of these limitations, a single lens reflex camera is required in order to take a picture using a zoom lens.

However, a single lens reflex camera is more expensive, and heavier than a lens shutter type of camera and, accordingly, it is not easy for a photographer unfamiliar with such a camera to master it. Because of heavy weight and large size of the single lens reflex camera, female photographers and travelers, who usually try to reduce the weight and the number of baggages they must carry, tend to hesitate to use single lens reflex cameras, even if they will recognize that high quality pictures may be taken with such cameras.

In addition, conventional single lens reflex cameras do not have a strobe device. Therefore, it is necessary for photographers who desire to use a strobe device, e.g., for taking photographs at night, to use one which can be attached to the camera body.

Based on the foregoing camera, users who do not like single lens reflex cameras, which are relatively bulky and heavy as mentioned above, have only two choices: a light and small lens shutter type of automatic camera which can not control focal length; and a two-focal length type of auto-focus camera in which only two extreme focal lengths can be used.

In other words, it is generally accepted that the focal length can not be varied or only two focal lengths can be used in the existing lens shutter type of camera. However, if a lens shutter type of camera having a zoom lens was available on the market, the market could be stimulated as camera users could be expected to increase, these new users being persons who presently consider single lens reflex cameras too big to carry and the not able to satisfy all of their needs.

The assignee of the present application has developed and filed a number of patent applications directed to a lens shutter type of camera having a zoom lens and a variable illumination angle strobe device, which satisfies the above mentioned requirements (USSN 144,0303, PCT/JP87/00293). In this lens shutter type of camera, the illumination angle of the strobe device varies in accordance with the change of focal length of the zoom lens, and the focal length of the zoom lens and the illumination angle of the variable illumination angle strobe device have a constant relationship between each other. In certain cases, however, problems arise with where such cameras, especially in cases where a photographer intends to make a special purpose strobe photograph. An example of such a case would be a, where only an intermediate figure (person) between certain objects or other people should be illuminated with the strobe light. Another case involves an object which is located further beyond the normal object distance range in which the strobe photographing can be effected, in which case it is desired to take a photograph with the use of the strobe device.

SUMMARY OF THE INVENTION

The present invention is directed to a camera having a zoom lens and a variable illumination angle strobe device as mentioned above.

The primary object of the present invention is to provide a compact camera having a variable illumination angle strobe device in which the illumination angle can be varied in accordance with the focal length of the zoom lens, and wherein the illumination angle of the strobe device can also be adjusted manually, independently of the change in the focal length.

To achieve the object mentioned above, according to the present invention, there is provided a camera having a zoom lens which has a group of variable power lenses for changing the focal length of the lens; a variable illumination angle strobe device which has a condenser lens, a light emitting tube and a light reflecting shade which are relatively movable in the optical axis direction to change the illumination angle; wherein the variable illumination angle strobe device has an association mechanism which is driven in association with the focal length of the zoom lens, and an independently movable mechanism which is driven independently of the association mechanism, so that the variable illumination angle strobe device can illuminate the light not only at an illumination angle in connection with the change of the focal length of the zoom lens, but also at any other illumination angle independently of the focal length.

BRIEF DESCRIPTION OF DRAWINGS

The invention will be described below in detail with reference to the accompanying drawings wherein.

DETAILED DESCRIPTION OF EMBODIMENTS

Figure 1:
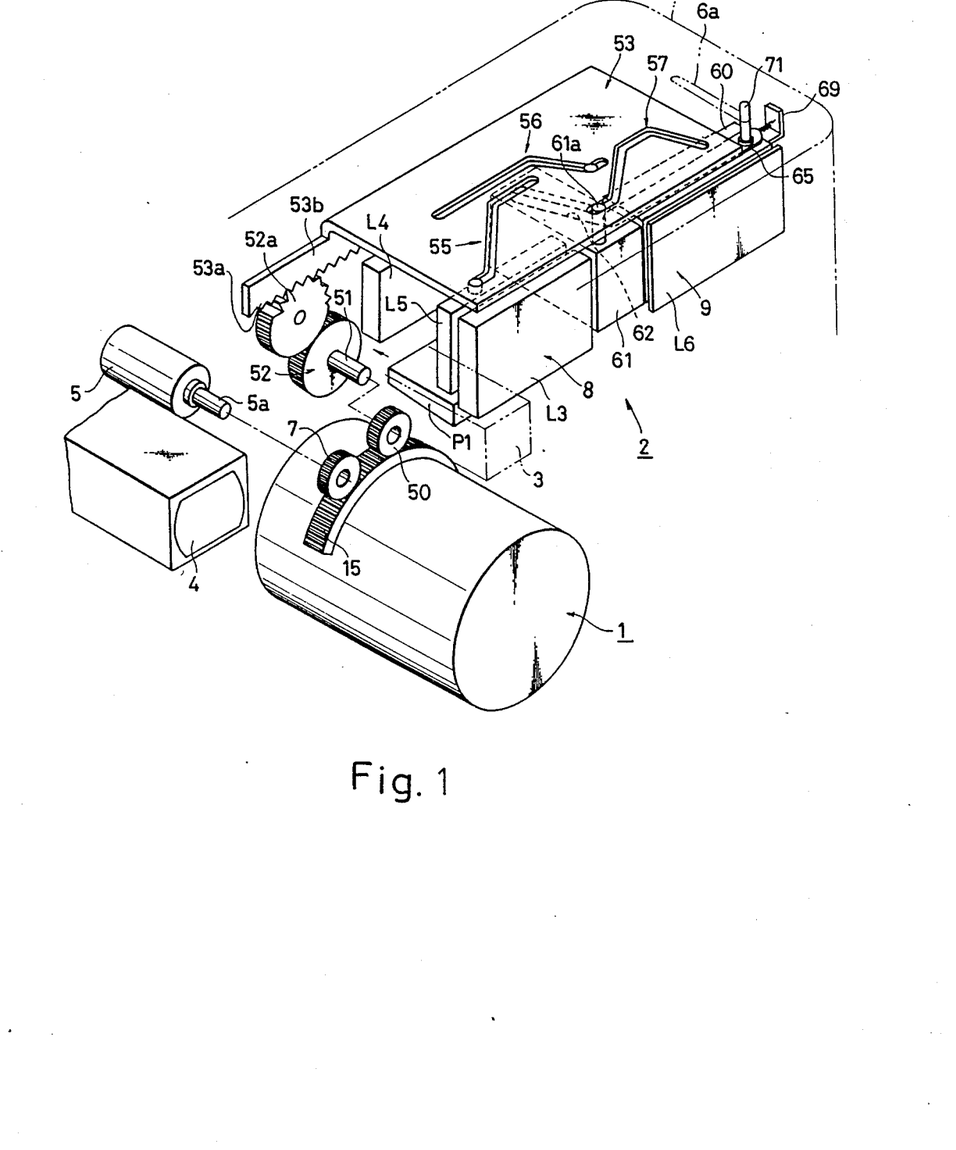
FIG. 1 is a schematic perspective view of main components of a lens shutter type of zoom lens camera having a variable illumination angle strobe device incorporated therein, according to one aspect of the present invention.

A lens shutter type of camera to which the present invention is applied has a lens barrel block 1 for a zoom lens, a finder and strobe block 2 which will be referred to as a strobe block, an object distance measuring device (AF device) having a light emitter 3 and a light receiver 4, and a zoom motor 5 for the zooming operation. These elements are secured to a camera body 6.

Figure 2:
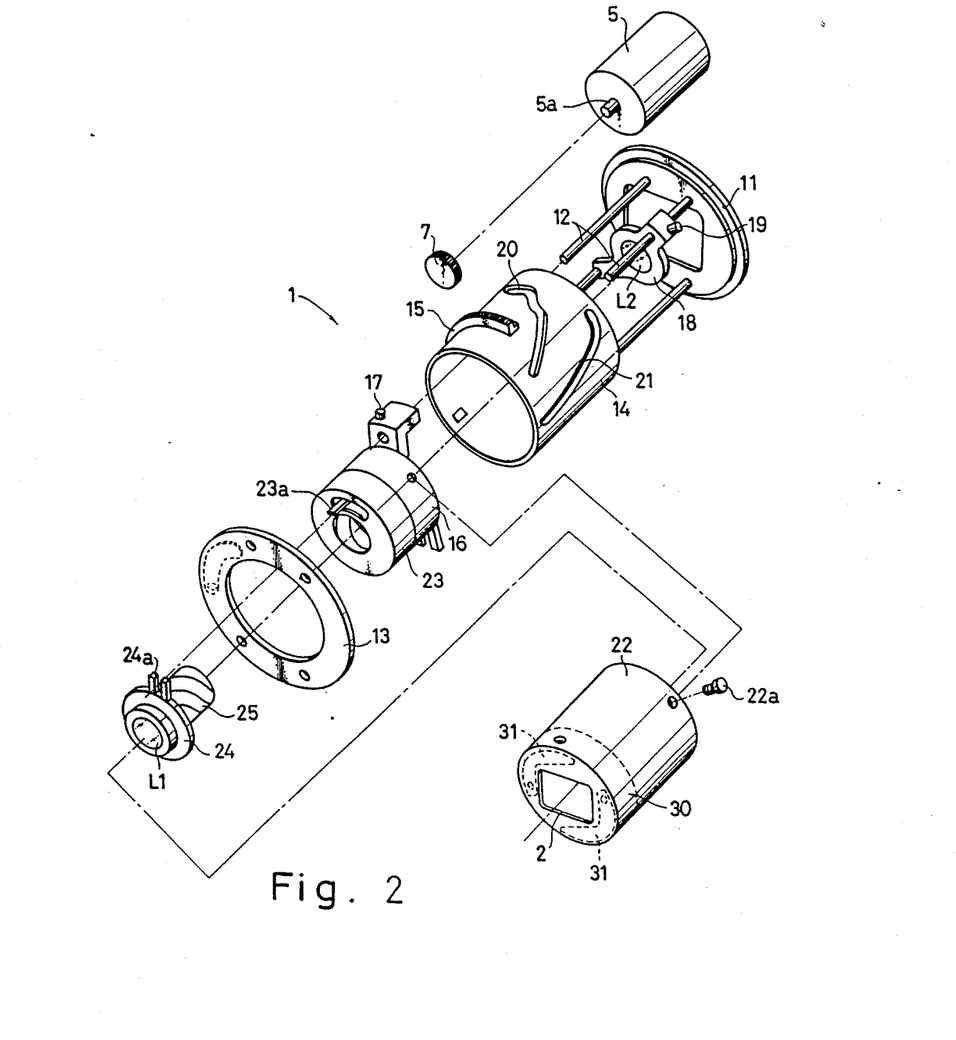
FIG. 2 is an exploded perspective view of the lens barrel block of the camera shown in FIG. 1.

First, reference is made to the construction of the lens barrel block 1 which is driven by the zoom motor 5, as shown in FIG. 2. The lens barrel block 1 not only has a zooming function, but it also has a macro-photographing function. A rear securing plate 11 is secured to the camera body 6. The rear securing plate 11 has four parallel guide rods 12 secured thereto in parallel with the optical axis. A front securing plate 13 is connected to the front ends of the guide rods 12. The component mentioned above are main stationary elements of the lens barrel block 1.

Between the rear securing plate 11 and the front securing plate 13 is rotatably supported a cam ring 14 which is provided, on its outer periphery, with a gear 15 which can be engaged directly or through a gear train by a pinion 7 secured to a drive shaft 5a of the zoom motor 5. The gear 15 is a sector gear which covers the rotational displacement of the cam ring 14. The cam ring 14 has zooming cam grooves 20 and 21 for front and rear lens groups.

Rollers 17 and 19 for front frame 16 and rear frame 18, which rollers are movably fitted on the guide rods 12, are fitted in the zooming cam grooves 20 and 21, respectively. The front frame 16 has a decoration frame 22 which is secured thereto by set screws 22a and a shutter block 23 connected to frame 16. A front lens frame 24 which supports a front group of lenses which will be referred to as a front lens group L1, is screw-engaged by the shutter block 23 through a helicoid 25. The front lens frame 24 has an arm 24a which can be engaged by a lens feeding lever 23a of the shutter block 23, so that when the lens feeding lever 23a rotates in the circumferential direction to rotate the front lens frame 24, the front lens frame 24 moves in the optical axis direction (forward and rearward) along the helicoid 25. A group of rear lenses which will be referred to as a rear lens group L2, is secured directly to the rear frame 18. In the illustrated embodiment, the front lens group L1 and the rear lens group L2 constitute a zooming photographing optical system (zoom lens).

Shutter block 23 rotates the lens feeding lever 23a by an angular displacement corresponding to a distance signal measured by the object distance measuring device. This distance measuring device includes light emitter 3, light receiver 4, and a pulse motor that is incorporated therein, which pulse motor opens the shutter (sector) which has been closed for a predetermined period of time. After such opening, the shutter is closed again and the lens feeding lever 23a is returned to its initial position.

In the illustrated embodiment, the zoom motor 5 is used not only as a drive source for the zooming operation but also as a drive for moving the finder device 8 and the strobe device 9 of the finder block 2 in association with the zooming operation. That is, as can be seen from FIG. 1, the finder device 8 and the strobe device 9, included in the strobe block 2, vary the finder field of view and the illumination angle (light intensity) of the strobe in association with the variation of the focal length of the lens barrel block 1.

The gear 15 of the cam ring 14 is in mesh with another pinion 50 having a shaft 51 which extends rearward, with the rear end of the shaft 51 having reduction gear device 52 connected to its end. A terminal gear 52a of the reduction gear device 52 meshes with a rack 53a of a cam plate 53. The cam plate 53 is located above the finder device 8 and the strobe device 9, so that the cam plate 53 is slidable in directions perpendicular to the optical axis. The directions of the movement of the cam plate 53 will henceforth be referred to as right and left directions. The cam plate 53 is provided, on its rear end portion, with downwardly bent portion 53b which is in turn provided, on its lower end (front end), with the rack 53a integral with bent portion 53b. The reduction gear device 52 reduces the number of revolutions of the gear 15 to transmit movement of the cam ring 14, suitably reduced, to the cam plate 53. The cam plate 53 has a variable power cam groove 55 for the finder device 8, a parallax correcting cam groove 56, and a strobe cam groove 57 for the strobe device 9.

The lens system of the finder device 8 is essentially composed of a stationary lens group L3 and an eyepiece lens group L4, on the object side, and a movable variable power lens group L5. The lens system of the finder device 8 also has a refractive prism P1 which is used on the macro-mode. The variable power lens group L5 is adapted to make the image plane adjusted by the variable power operation of the lens barrel block 1 identical to the finder field of view of the finder device 8. The prism P1 is brought onto the optical axis only during the macro-mode to correct the parallax. It should be noted that in a lens shutter type of camera, parallax is inevitable and the amount of parallax increases as the object distance decreases. It should also be noted that in the zoom lens camera according to the illustrated embodiment, the macro-photographing can be effected and accordingly the amount of parallax becomes large. This is a reason that the wedge-shaped prism P1 having a larger thickness at its low end comes onto the optical axis to refract the optical axis downward, so that the closer object can be viewed.

Figure 5:
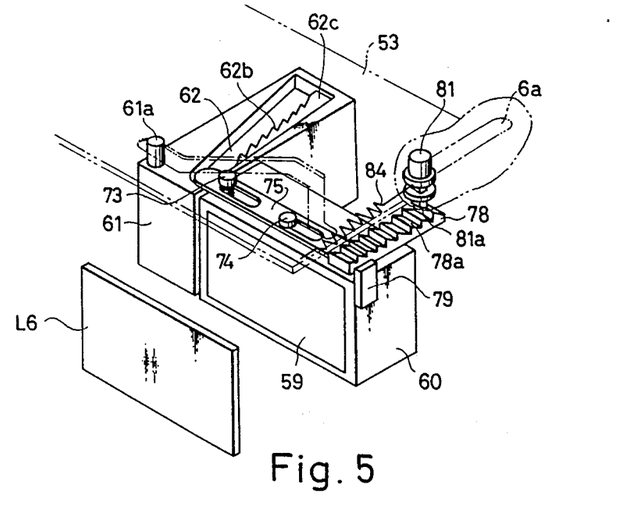
FIG. 5 is a schematic perspective view of main components of a camera according to another aspect of the present invention.

The strobe device 9 decreases the illumination angle as the focal length of the photographing lens becomes long, i.e. as the lens is moved forward. The strobe device 9 also increases the illumination angle to decrease the amount of light incident upon the object, during the macro-mode. To this end, in the illustrated embodiment, the Fresnel lens (condenser lens) L6 is immovable, and the strobe case 60 which incorporates therein a xenon lamp (light emitting tube) 58 (FIG. 3) and the reflecting shade 59 (FIGS. 3, 5 and 9); moves in the optical axis direction to vary the illumination angle. In order to vary the illumination angle, it is necessary only to move either the Fresnel lens L6 or the xenon lamp 58, or the reflecting shade 59, so that they come close to and away from each other.

The present invention is applicable to the variable illumination angle strobe device in which the illumination angle can be automatically varied in accordance with the zooming operation of the zoom lens. That is, according to the present invention, the illumination angle can be manually controlled, in addition to being automatically varied based on zooming operation.

Figure 3:
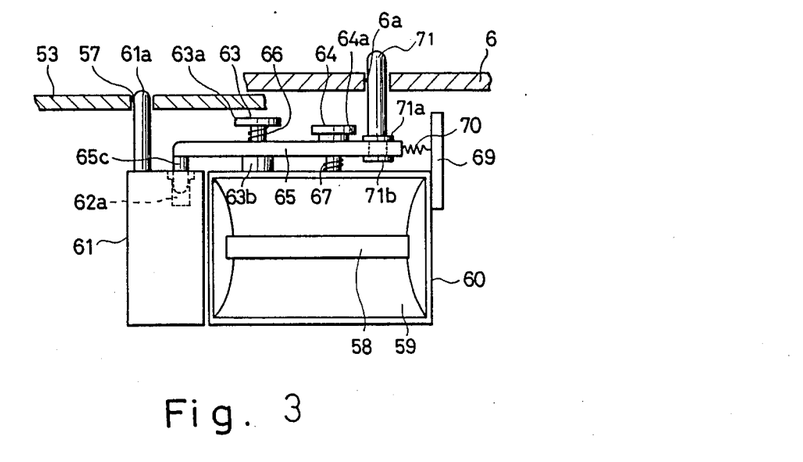
FIG. 3 is a partial sectional front elevational view of a main part of FIG. 1.
Figure 4:
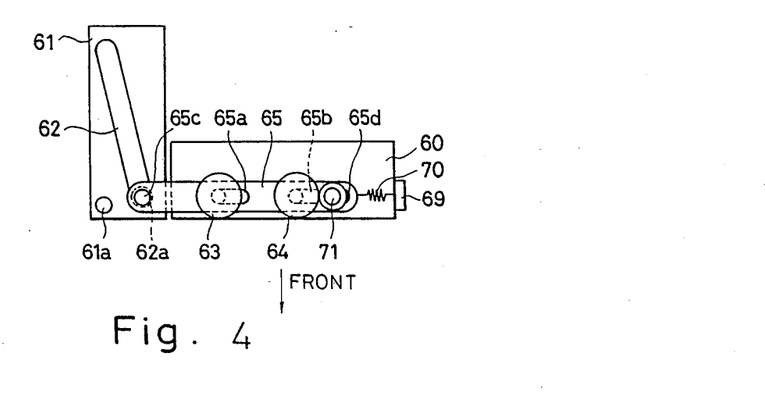
FIG. 4 is a plan view of a main part of FIG. 1.

The following discussion will be addressed to a first embodiment of the invention, with reference to FIGS. 1, 3 and 4. Adjacent to the strobe case 60 is a movable block 61 which is in the form of a thick plate that is movable forward and rearward. Movable block 61 has an inclined guide groove 62 which is formed on the upper surface of block 61, so that the inclined guide groove 62 comes away from the strobe case 60 at the rear end of the groove 62. On the upper surface of the movable block 61 is an association pin 61a integral with the block 61 which is inserted in the strobe cam groove 57 of the cam plate 53, so that the movable block 61 can move forward and backward in accordance with the right and left movement of the cam plate 53.

Two spaced right and left pins 63 and 64 are provided on the upper surface of the strobe case 60. The pins 63 and 64 are fitted in corresponding elongated holes 65a and 65b which are formed on a connecting plate 65 spaced from each other in the right and left hand directions. The pin 63 has at its base portion a larger diameter portion 63b, so that the connection plate 65 can be elastically pressed against the larger diameter portion 63b by a compression spring 66 which is disposed between the connecting plate 65 and a flanged head 63a of the pin 63. Between the strobe case 60 and the connecting plate 65 is provided a compression spring 67 which surrounds the other pin 64 and which is stronger than compression spring 66, so that the connection plate 65 is elastically pressed against the flanged head 64a of the pin 64. Thus, the connecting plate 65 can be inclined or rotated about the elongated hole 65a (larger diameter portion 63b) or the vicinity of elongated hole 65e.

The connecting plate 65 is provided, on its end adjacent to the movable block 61 (i.e. the left end in FIGS. 3 and 4), with an engagement pin 65c which extends downward to be normally fitted in an engagement hole 62a formed on the bottom of the front end of the guide groove 62, so that the strobe case 60 and the movable block 61 can be moved together forward and backward. That is, when the cam plate 53 moves right and left, the strobe case 60 moves forward and backward together with the movable block 61 which moves in accordance with the profile of the strobe cam groove 57.

The strobe cam groove 57 has a variable power section 11 and a macro-feeding section 12 (FIG. 1). The variable power section 11 is for retracting the strobe case 60 with respect to the Fresnel lens L6 in accordance with an increase of the focal length of the zoom lens. The retraction (backward movement) of the strobe case 60 decreases the range of illumination angle of the light transmitted through the Fresnel lens L6 to substantially increase the guide number in accordance with the increase of the focal length. On the other hand, in the macro-feeding section 12 following to the longest focal length, the strobe case 60 is moved forward with respect to the Fresnel lens L6 to increase the illumination angle, thereby substantially decreasing the guide number at the macro-mode. It should be noted that the cam plate 53 moves left from the position shown in FIG. 1 when the focal length of the zoom lens increases. When the zoom lens comes into the macro-mode area from the longest focal length, the cam plate 53 moves further in the left direction.

Between the end of the connecting plate 65 distant from the engagement pin 65c (i.e. the right end in FIGS. 3 and 4) and a projection 69 provided on the strobe case 60 is provided a tensile spring 70 which continuously biases the connection plate 65 in the right hand direction in FIGS. 3 and 4. The connection plate 65 has an elongated hole 65d which extends in the longitudinal direction and in which an operation knob 71 is inserted, so that the operation knob 71 can be secured to the connection plate 65 by flanges 71a and 71b which hold the connecting plate between those flanges. The upper end of the operation knob 71 projects outward through an elongated hole 6a formed in the upper surface of the camera body 6 in parallel with the optical axis. Accordingly, when the operation knob 71 is pushed down, the connecting plate 65 is inclined or rotated about the elongated hole 65a (the larger diameter portion 63b) as a fulcrum in the clockwise direction in FIG. 3, so that the engagement pin 65c is disengaged from the engagement hole 62a. Note that in the movement of the connecting plate 65, the elongated hole 65d (flange 71a) serves as a point to which the external force is applied. As a result, the strobe case 60 is released from the movable block 61, so that the strobe case 60 is free to move forward and backward. It should be noted that the engagement pin 65c is not disengaged from the guide groove 62. It should also be noted that even when the connecting plate 65 moves right and left, the operation knob 71 does not move, because a relative movement takes place between the operation knob 71 and the elongated hole 65d.

As can be understood from the foregoing, when the operation knob 71 is pushed down and is moved backward from the position shown in FIG. 3 by an operator, the strobe case 60 is moved backward together. The backward movement of the strobe case 60 causes the engagement pin 65c to slide on the wall surface of the guide groove 62 adjacent to the strobe case 60 in the left hand direction while tensing the tensile spring 70. By the backward movement of the strobe case 60, the range of the illumination angle of the light transmitted through the Fresnel lens L6 is decreased, so that the guide number can be substantially increased. Therefore, after the strobe case 60 is positioned in place, when the xenon lamp 58 is turned ON to emit light, the strobe illumination angle can be varied independently of the focal length of the photographing lens. Since the electrical circuit for emitting the light of the xenon lamp 58 is not a subject of the invention, no explanation and illustration therefor is given herein.

When the operation knob 71 is released in the state in which the strobe case 60 is retracted, the connecting plate 65 is moved toward the strobe case 60 by the tensile spring 70. Furthermore, since the connecting plate 65 is biased for rotation in the counterclockwise direction in FIG. 3 by the compression spring 67, the connecting plate 65 moves together with the strobe case 60 while keeping the slide contact of the engagement pin 65c with the guide groove 62, so that when the connecting plate 65 is returned to its initial position, the engagement pin 65c comes into engagement in the engagement hole 62a, thus resulting in the integral connection of the strobe case 60 to the movable block 61 again. As a result, the strobe case 60 is again associated with the cam groove 57, so that the strobe case 60 moves in accordance with the focal length of the zoom lens.

FIGS. 5 to 8 show a second embodiment of the invention. In the first embodiment mentioned above, the strobe case 60 is automatically returned to its initial position by releasing the operation knob 71 after the strobe case is manually retracted (moved backward). In the second embodiment, when the operation knob is released, the strobe case 60 can be stopped at any optional retracted position, unlike the first embodiment, as follows.

The connecting plate 75 is attached to the strobe case 60 in the similar way to the connecting plate 65, so that in the initial position, the engagement pin 75c is fitted in the engagement hole 62a. On the upper surface of the strobe case 60 are provided two spaced right and left pins 73 and 74 which are fitted in the corresponding elongated holes 75a and 75b which are formed in the connecting plate 75. The pin 73 has at its base portion a larger diameter portion 73b against which the connecting plate 75 is elastically pressed by the compression spring 76 provided between the connecting plate 75 and the flanged head 73a of the pin 73. The other pin 74 is surrounded by the compression spring 77 which is stronger than the compression spring 76 and which is located between the strobe case 60 and the connecting plate 75, so that the latter is elastically pressed against the flanged head 73a of the pin 73.

The rack 62b which extends rearward from the engagement hole 62a is formed on the wall surface (the right wall surface in FIG. 7) of the guide groove 62 formed in the movable block 61, adjacent to the strobe case 60. Furthermore, the movable block 61 has a shallow guide groove 62c which is located on the rack 62b and on the side adjacent to the strobe case 60. The shallow guide groove 62c is inclined to be far from the strobe case 60 toward the rear end of the groove 62c.

On the end (the right end in FIGS. 6 and 7) of the connecting plate 75 opposite to the engagement pin 75c is formed a rack plate 78 integral therewith in parallel with the optical axis. The rack plate 78 has at its upper surface a rack 78a which consists of teeth having front vertical faces and rear inclined faces. The rack 78a has a pitch corresponding to that of the rack 62b of the guide groove 62.

Figure 6:
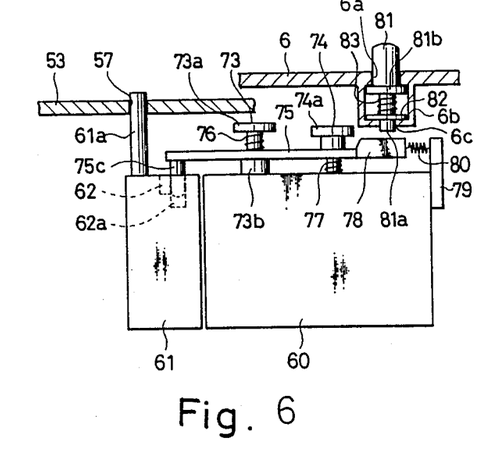
FIG. 6 is a partial sectional view of a main part of the camera shown in FIG. 5.
Figure 7:
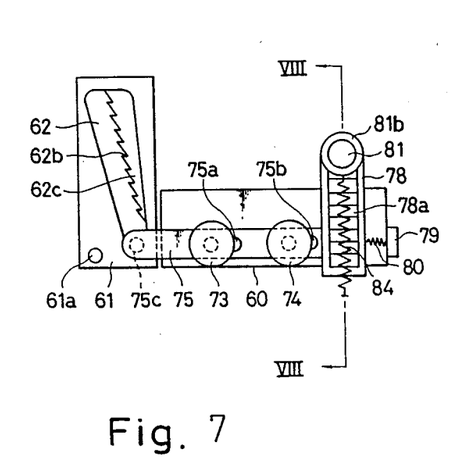
FIG. 7 is a plan view of a main part of the camera shown in FIG. 5.
Figure 8:
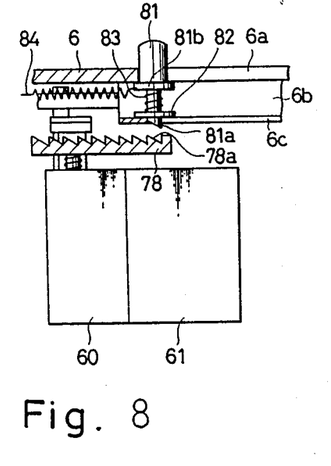
FIG. 8 is a sectional view taken along line VIII—VIII in FIG. 7.

The projection 79 is secured to the side face of the strobe case 60 opposite to the movable block 61. Between the rack plate 78 and the projection 79 is provided a tensile spring 80 which continuously biases the rack plate 78 and, accordingly, the connecting plate 75 toward the strobe case 60.

The camera body 6 has an elongated hole 6a which is located above the rack plate 78 and which extends in parallel with the optical axis. The camera body 6 has a guide box 6b which is connected thereto and which is located below the elongated hole 6a. The guide box 6b has a rectangular cross sectional shape extending along the elongated hole 6a. The guide box 6b is provided, on its bottom, with a guide groove 6c which extends in parallel with and directly below the elongated hole 6a (FIG. 6).

The operation knob 81 extends through the elongated hole 6a and the guide groove 6c. The operation knob 81 has a lower engagement end 81a which extends through the guide groove 6c and which has opposite planar side faces parallel to each other to prevent the rotation of the operation knob 81. The front end (lower end) of the operation knob 81 has an inclined surface corresponding to the inclined surface of the rack 78a.

The operation knob 81 has a flange 81b integral therewith, located in the guide box 6b. A washer 82 is inserted between the flange 81b and the guide box 6b. Between the flange 81b and the washer 82 is provided compression spring 83 which continuously biases the operation knob 81 to project from the elongated hole 6a.

A tensile spring 84 is provided between the flange 81b and the front face of the camera body 6 to bias the flange 81b and, accordingly the operation knob 81 forward. As a result, the operation knob 81 normally bears against the front wall of the elongated hole 6a and the guide groove 6c, so that the lower engagement end 81a thereof is stopped at and of the rack plate 78.

The apparatus according to the second embodiment of the present invention operates as follows.

When the operation knob 81 which is located in the initial position shown in FIGS. 5 to 8 is pushed down, the engagement end 81a comes into engagement with the rack 78a to move the rack 78a downward, so that the connecting plate 75 rotates in the clockwise direction in FIG. 6. As a result, the engagement pin 75c comes out of the engagement hole 62a, so that the engagement pin 75c occupies a position (height) in which it can be engaged by the rack 62b.

In this state, when the operation knob 81 is moved rearward, the engagement pin 75c of the connecting plate 75, which is biased by the tensile spring 80 toward the strobe case 60, comes into slide contact with the rack 62b to move right and left along the profile of the rack 62b. That is, the engagement pin 75c moves along the inclined faces of the rack 62b in such a way that the engagement pin 75c rides over one tooth of the rack and comes into the bottom of the adjacent tooth.

In this state, if the operation knob 81 is released, the connecting plate 75 is maintained in that position, since the engagement pin 75c is engaged by the rack 62b. As a result, the strobe case 60 is moved rearward (retracted) by one pitch of the rack 62b and is stopped in a state in which the illumination angle is reduced by a displacement corresponding to one pitch. The operation knob 81 is then moved upward by the compression spring 83, so that the engagement end 81a is disengaged from the rack 78a. As a result, the operation knob 81 is moved forward by the tensile spring 84, so that it comes into abutment with the front wall surface of the elongated hole 6a, resulting in a stoppage of the operation knob 81. It should be appreciated that the adjustment of the displacement of the backward movement of the operation knob 81 makes it possible to cause the movement of more than one pitch of the rack 62b at one time.

The following discussion will be directed to the operation for returning the strobe case 60 to the initial position.

When the strobe case 60 is located in the retracted position, the slight pushing operation of the operation knob 81 is not enough to disengage the engagement pin 75c from the rack 62b. A further pushing operation of the operation knob 81 with a stronger force causes the engagement pin 75c to be disengaged from the rack 62b, against the compression spring 77. The connecting plate 75 is moved toward the strobe case 60 by the tensile spring 80, so that the engagement pin 75c rides on the shallow guide groove 62c. The connecting plate 75 stops when the engagement pin 75c comes into abutment with the end of the shallow guide groove 62c.

When the operation knob 81 is released, the engagement end 81a is disengaged from the rack 78a and, accordingly, the connecting plate 75 is moved forward by the tensile spring 80 while bringing the engagement pin 75c into slide contact with the right wall surface of the shallow guide groove 62. When the connecting plate 75 comes to the initial position, the engagement pin 75c is engaged in the engagement hole 62a, so that the connecting plate 75 stops. Namely, the strobe case 60 comes to the initial position and stops there to be integral with the movable block 61.

If it is impossible to provide a large enough inclination of the shallow guide groove 62c to move the strobe case 60 forward by the tensile force of the tensile spring 80, it is possible to provide a tensile spring between the camera body 6 and the strobe case 60 or the connecting plate 75 to continuously bias the strobe case 60 forward. The strobe case 60 moves together with the movable block 61 at any retracted position, so that it moves in association with the zooming operation in accordance with the movement of the cam plate 53.

In the first and second embodiments mentioned above, it is impossible to learn the guide number when the strobe case 60 is retracted. Furthermore, there is a possibility of an over-exposure which occurs when the picture is taken at the close object distance and at the retracted position of the strobe case 60 (i.e., in the state that the illumination angle is reduced and the guide number is increased) in an auto-photographing at an auto-strobe in which the exposure is controlled in accordance with the distance signal from the object distance measuring device.

Figure 9:
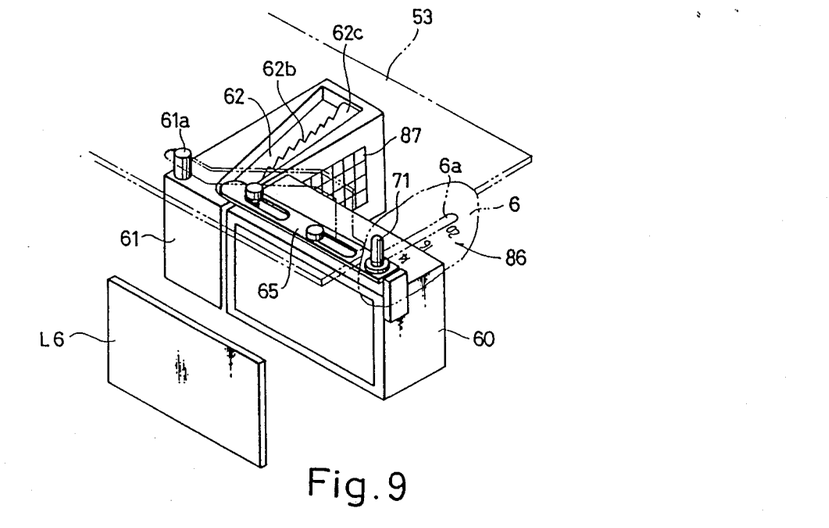
FIG. 9 is a schematic perspective view of main components of a camera according to still another aspect of the present invention; and, FIG. 10 is a front elevational view of a main part of FIG. 9.
Figure 10:
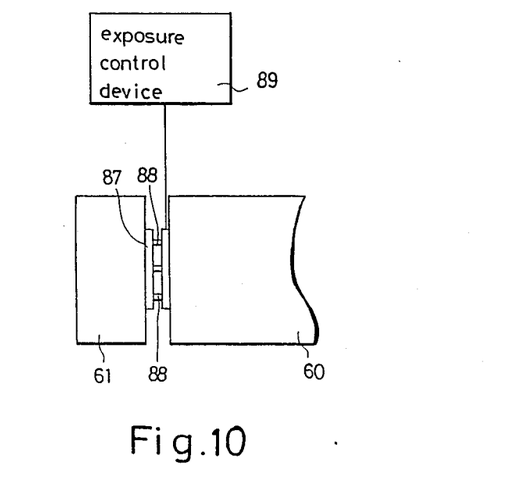

FIGS. 9 and 10 show another embodiment which an solve the problems mentioned above. In this embodiment, the construction of the first embodiment in which the operation knob 71 moves together with the connecting plate 65 is applied to the association mechanism of the operation knob and the connecting plate in the second embodiment. In addition to the foregoing, means for indicating the guide number in accordance with the position of the strobe case 60 and means for transmitting the guide number signal to an exposure control device are provided.

More specifically, a scale (calibration) 86 corresponding to the guide number in accordance with the position of the operation knob 71 is provided on the surface edge of the elongated hole 6a from which the operation knob 71 projects. Accordingly, since the operation knob 71 always moves together with the strobe case 60, the scale 86 corresponding to the position of the operation knob 71 represents the present guide number. Furthermore, by operating the operation knob 71 in a similar way as in the first embodiment to move the same to a position which meets the desired guide number while looking at the scale 86, the object distance and the guide number corresponding to the diaphragm can be easily set.

Onto the wall surface of the movable block 61 adjacent to the strobe case 60 is applied a code plate 87 which shows the guide number corresponding to the position of the strobe case 60. On the other hand, a reader 88 which comes into slide contact with the code plate 87 to read the same is provided on the wall surface of the strobe case 60. The reader 88 is electrically connected to the exposure control device 89, so that the signal of the code plate 87, i.e. the guide number, is sent to the exposure control device 89 to perform a proper automatic exposure control.

It should be noted that although the above discussion has been directed to the lens shutter type of camera, the present invention is not limited thereto and can be applied to other camera, such as a single-lens reflex camera, an electronic camera, or a video camera.

I claim:

1. A camera comprising a zoom lens which has a group of variable power lenses for changing the focal length of said lens, a variable illumination angle strobe device which has an illumination angle varying mechanism having a condenser lens, a light emitting tube and a light reflecting shade, said condenser lens, said light emitting tube and said light reflecting shade being relatively movable in the optical axis direction to change the illumination angle of said strobe device, wherein said illumination angle varying mechanism comprises association means for controlling the illumination angle in association with the focal length of the zoom lens and an independently driven means for controlling the illumination angle independently of the association means.

2. A camera according to claim 1, further comprising a camera body to which said condenser lens is secured and wherein said illumination angle varying mechanism comprises a strobe case in which the light emitting tube and the light reflecting shade are integrally provided.

3. A camera according to claim 2, wherein said association means comprises means for moving the strobe case in association with the focal length of the zoom lens.

4. A camera according to claim 3, wherein said independently driven means comprises means for moving the strobe case independently of the focal length of the zoom lens.

5. A camera according to claim 4, wherein said association means comprises a cam plate which moves in association with the focal length of the zoom lens and which has a cam groove, a movable block which moves in the optical axis direction along the cam groove of the cam plate in accordance with the focal length of the zoom lens, and means for intergrally connecting the movable block and the strobe case.

6. A camera according to claim 5, wherein said means for integrally connecting the movable block and the strobe case comprises a connecting plate which is tiltably supported on the strobe case, an engagement pin which is provided on the end of the connecting plate that is adjacent to the movable block, an engagement hole which is formed in the movable block and in which the engagement pin can be fitted, and biasing means for biasing the connecting plate into an engagement position in which the engagement pin is fitted in the engagement hole.

7. A camera according to claim 6, wherein said independently driven means comprises disengaging means for inclining the connecting plate against the biasing means to disengage the engagement pin from the engagement hole.

8. A camera according to claim 6, wherein said disengaging means comprises an operation knob which is provided on the end of the connecting plate opposite to the engagement pin, said knob adapted to be actuated from the exterior of said camera body.

9. A camera according to claim 8, wherein said movable block has a guide groove for the strobe case, wherein the engagement hole of the movable block is formed at one end of the guide groove so as to have a deeper bottom than the guide groove, whereby when the engagement pin is disengaged from the engaging hole, the strobe case is movable relative to the movable block.

10. A camera according to claim 9, further comprising driving means for independently moving the strobe case when the engagement pin is disengaged from the engagement hole of the movable block.

11. A camera according to claim 10, wherein said driving means comprises an operation knob which is provided on the end of the connecting plate distant from the engagement pin and which can be actuated from the exterior of the camera body to slide and be pushed down.

12. A camera according to claim 11, further comprising means for indicating the guide number depending on the position of the operation knob.

13. A camera according to claim 12, wherein said indicating means comprises a scale on the camera body for representing the guide number.

14. A camera according to claim 13, further comprising reading means between the movable block and the strobe case for reading the guide number depending on the position of the strobe case which moves relative to the movable block.

15. A camera according to claim 14, further comprising exposure control means for controlling the exposure in accordance with the guide number detected by the reading means which is connected to the exposure control means.

16. A camera according to claim 9, wherein said guide groove of the movable block is inclined to be moved away from the strobe case in a rearward direction.

17. A camera according to claim 16, wherein said biasing means for biasing the connecting plate into the engagement position comprises a spring which biases the connecting plate toward the strobe case.

18. A camera according to claim 5, further comprising abutment means for stopping the strobe case, which is moved by the independently driven means, at a desired position.

19. A camera according to claim 18, wherein said abutment means is provided between the strobe case and the movable block which moves in association with the focal length of the zoom lens.

20. A camera according to claim 19, wherein said guide groove is provided with a rack which can be engaged by the engagement pin to stop the strobe case at a desired position.

21. A camera according to claim 20, wherein said rack provides a plurality of abutment positions of the strobe case.

22. A camera according to claim 21, wherein said movable block has a shallow guide groove which is shallower than the movable block guided groove for the strobe case, so that when the engagement pin is engaged in the shallow guide groove, the strobe case can be returned to its initial position.

* * * * *

UNITED STATES PATENT AND TRADEMARK OFFICE
CERTIFICATE OF CORRECTION

PATENT NO. : 4,914,461

DATED : April 3, 1990

INVENTOR(S) : M. HORI

It is certified that error appears in the above-identified patent and that said Letters Patent is hereby corrected as shown below:

In column 1, line 42, delete "will".
In column 1, line 64, delete "the".
In column 2, line 2, change "144,0303" to ---144,030---.
In column 2, line 11, after "be" delete "a,".
In column 3, line 25, change "component" to ---components---.
In column 3, line 43, after "lenses" insert ---,---.
In column 3, line 52, after "lenses" insert ---,---.
In column 4, line 45, change "accordingly" to ---, accordingly,---.
In column 4, line 52, after "i.e." insert ---,---.
In column 4, line 59, change ";" to ---,---.
In column 5, line 35, change "65e" to ---65a---.
In column 5, line 37, after "i.e." insert ---,---.
In column 5, line 68, after "i.e." insert ---,---.
In column 7, line 23, change "73a" to ---74a---.
In column 7, line 23, change "73" to ---74---.
In column 8, line 6, after "accordingly" insert ---,---.
In column 8, line 10, before "of" insert ---initial position in which the end 81a is above the rack 78a---.
In column 8, line 10, change "and" to ---an---.
In column 8, lines 19/20, change "so that the engagement pin 75c occupies" to ---to come to occupy---.
In column 8, line 68, change "62" to ---62c---.
In column 9, line 28, change "an" to ---can---.
In column 9, line 60, after "i.e." insert ---,---.
In column 9, line 66, change "camera" to ---cameras---.

UNITED STATES PATENT AND TRADEMARK OFFICE
CERTIFICATE OF CORRECTION

PATENT NO. : 4,914,461

DATED : April 3, 1990

INVENTOR(S) : M. Hori

It is certified that error appears in the above-identified patent and that said Letters Patent is hereby corrected as shown below:

Column 10, claim 5, line 7, change "intergrally" to --integrally--.
Column 12, claim 22, line 3, change "guided" to --guide--.

Signed and Sealed this

Fourth Day of May, 1993

Attest:

MICHAEL K. KIRK

Attesting Officer

Acting Commissioner of Patents and Trademarks